(12) United States Patent
Tan et al.

(10) Patent No.: US 11,806,662 B2
(45) Date of Patent: Nov. 7, 2023

(54) GAS DEHYDRATION

(71) Applicant: Dow Global Technologies LLC, Midland, MI (US)

(72) Inventors: Runyu Tan, Pearland, TX (US); Reba S. Georgetown, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 280 days.

(21) Appl. No.: 17/286,969

(22) PCT Filed: Oct. 22, 2019

(86) PCT No.: PCT/US2019/057369
§ 371 (c)(1),
(2) Date: Apr. 20, 2021

(87) PCT Pub. No.: WO2020/092055
PCT Pub. Date: May 7, 2020

(65) Prior Publication Data
US 2021/0387136 A1    Dec. 16, 2021

Related U.S. Application Data

(60) Provisional application No. 62/751,775, filed on Oct. 29, 2018.

(51) Int. Cl.
*B01D 53/28* (2006.01)
*B01D 53/14* (2006.01)
*B01D 53/26* (2006.01)

(52) U.S. Cl.
CPC ......... *B01D 53/28* (2013.01); *B01D 53/1493* (2013.01); *B01D 53/263* (2013.01); *B01D 2252/2023* (2013.01); *B01D 2252/20494* (2013.01); *B01D 2252/40* (2013.01); *B01D 2252/606* (2013.01); *B01D 2252/608* (2013.01)

(58) Field of Classification Search
None
See application file for complete search history.

(56) References Cited

U.S. PATENT DOCUMENTS

| 2,384,553 | A | | 9/1945 | Kiffer |
| 2,543,871 | A | | 3/1951 | Salathiel |
| 3,349,544 | A | | 10/1967 | Arnold et al. |
| 4,407,957 | A | * | 10/1983 | Lim ............... A61K 9/5073 427/213.33 |
| 4,555,484 | A | * | 11/1985 | LaRossa .............. C12Q 1/42 435/805 |
| 4,758,367 | A | | 7/1988 | George |

(Continued)

FOREIGN PATENT DOCUMENTS

| DE | 102010002349 A1 * | 8/2011 | ............... C09K 5/10 |
| WO | 2017069929 | 4/2017 | |
| WO | 2017189318 | 11/2017 | |

OTHER PUBLICATIONS

DE102010002349A1_ENG (Espacenet machine translation of Bareche) (Year: 2011).*

(Continued)

*Primary Examiner* — Gabriel E Gitman

(57) ABSTRACT

Embodiments relate to a gas dehydration drying agent solution composition, comprising a solvent that includes at least one glycol having a number average molecular weight from 40 g/mol to 500 g/mol and from 0.01 wt % to 8.00 wt % of a cyclohexylamino sulfonic salt.

7 Claims, 2 Drawing Sheets

(56) References Cited

U.S. PATENT DOCUMENTS

| | | | | |
|---|---|---|---|---|
| 5,206,219 A * | 4/1993 | Desai | ............... | A61K 38/27 |
| | | | | 424/490 |
| 6,569,913 B1 * | 5/2003 | Huygens | ............ | C08G 18/168 |
| | | | | 521/174 |
| 8,034,891 B2 * | 10/2011 | Okawa | ................ | C08G 77/46 |
| | | | | 528/25 |
| 2015/0267245 A1 * | 9/2015 | Hogan | ................ | C12Q 1/68 |
| | | | | 435/6.12 |
| 2017/0183587 A1 * | 6/2017 | Laroche | ............... | C10L 3/10 |

OTHER PUBLICATIONS

Achara, "Improving Gas Dehydration Using Pre-Inhibited Glycol", SPE Nigeria Annual International Conference and Exhibition, 2017, p. 1-8.

Contreras, "Petroleum sulfonates preparation and evaluation for chemical enhanced oil recovery in Colombian oil fields", 2014, p. 55-74.

Dakhil, "Study The Effect of PH and Concentration of Gloycol Solution In The Dehydration of Natural Gas", 2012, p. 1-12.

Long, "Comparison of zwitterionic N-alkylaminomethanesulfonic acids to related compounds in the Good buffer series", Beilstein Jounral of Organic Chemistry, 2010, p. 1-7, vol. 6. No. 31.

Pearce, "Fundamentals of Gas Dehydration Design and Operation With Glycol Solutions", p. 11-183.

PCT/US2019/057369, International Search Report and Written Opinion dated Feb. 10, 2020.

PCT/US2019/057369, International Preliminary Report on Patentability dated May 14, 2021.

* cited by examiner

GAS DEHYDRATION

FIELD

Embodiments relate to a gas dehydration drying agent solution, a process for dehydrating a gas using the gas dehydration drying agent solution, and a process for manufacturing the gas dehydration drying agent solution.

INTRODUCTION

Gases, such as natural gas, may contain varying amounts of water vapor. In certain applications, it may be desirable to minimize the amount of water vapor present in a gas, such as in a natural gas stream travelling in a pipeline. For example, the water vapor could cause damage such as corrosion and/or may freeze and block flow in the pipeline. Accordingly, a gas dehydration process may be performed on a gas stream to reduce the amount of water vapor present.

SUMMARY

Embodiments may be realized by providing a gas dehydration drying agent solution including a solvent that includes at least one glycol having a number average molecular weight from 40 g/mol to 500 g/mol and from 0.01 wt % to 8.00 wt % of a cyclohexylamino sulfonic salt having the following structure:

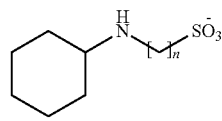

wherein n is from 1 to 6.

BRIEF DESCRIPTION OF THE DRAWINGS

Features of the embodiments will become more apparent to those of ordinary skill in the art by describing in detail exemplary embodiments thereof with reference to the attached drawings in which.

DETAILED DESCRIPTION

Figure 1:
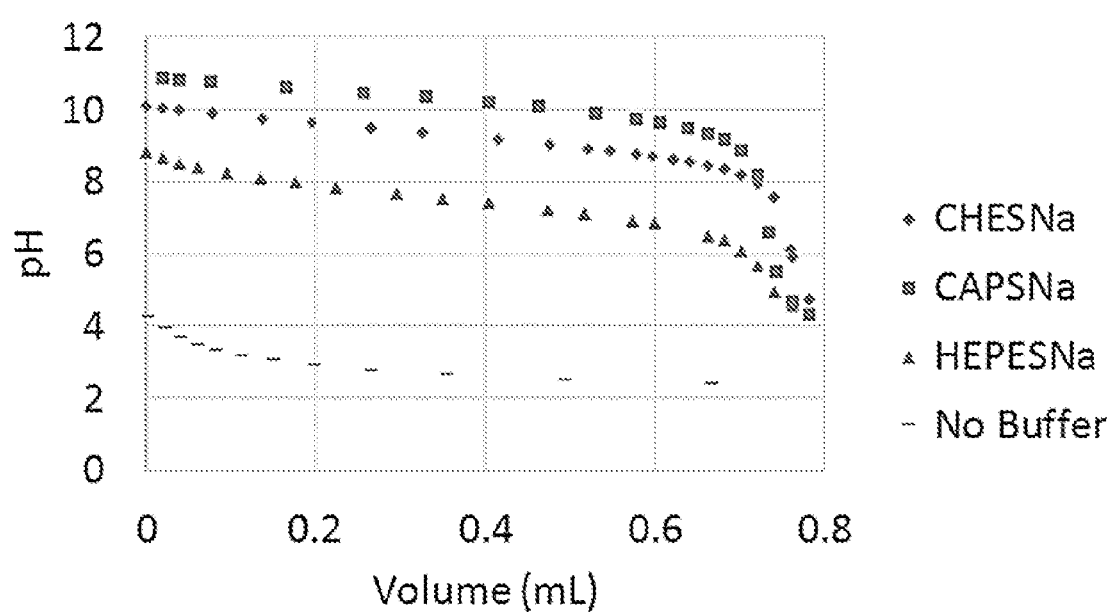
FIG. 1 illustrates alkalinity titration test data for Working Examples 1 and 2 and Comparative Examples A and B.

An exemplary method for removing moisture from gas streams, such as natural gas, is to use a gas dehydration unit that uses a drying agent solution. In such a unit, the natural gas may be contacted with the drying agent solution that includes at least a solvent and a pH buffering agent in an absorbent step to remove the water (e.g., water vapor). Then, a rich drying agent solution (i.e., the drying agent solution that contains the removed water) may be passed to a reconcentration or regeneration process where the absorbed water is removed from the rich drying agent solution. The reconcentration or regeneration process may include a reboiler. After the water is removed from the a rich drying agent solution, the spent drying agent solution may be reused for further gas dehydration in the gas dehydration unit.

According to embodiments, the gas dehydration drying agent solution includes at least a solvent and a pH buffering agent. During use, the drying agent solution could undergo thermal or oxidative degradation, e.g., at high temperature in the regeneration section of the process. By high temperature it is meant temperatures from 150° C. to 250° C. The degradation of the drying agent solution would generate carboxylic acids, which would lower the pH of the drying agent solution and make the solution corrosive to mild steel. As such, the pH buffering agent may be added to the drying agent solution to keep the pH of the solution within certain range, which could minimize corrosion. The desired pH range may be more than 6.0, more than 6.5, more than 7.0, more than 7.5, more than 8.0, less than 12.0, less than 11.0, less than 10.5, less than 10, less than 9.5, and/or less than 9.0.

The pH buffering agent is a cyclohexylamino sulfonic salt having the following structure:

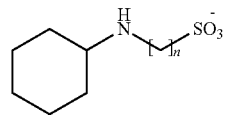

wherein n is from 1 to 6 (e.g., n is from 1 to 5, n is from 2 to 4, and/or n is 2 or 3).

The cyclohexylamino sulfonic salt may be present in the gas dehydration drying agent solution in an amount from 0.01 wt % to 8.00 wt % (e.g., from greater than 0.01 wt % to less than 8.00 wt %, from greater than 0.01 wt % to less than 7.50 wt %, from at least 0.05 wt % to less than 7.50 wt %, from at least 0.10 wt % to less than 7.50 wt %, from at least 0.05 wt % to less than 5.00 wt %, from at least 0.05 wt % to less than 4.00 wt %, from at least 0.05 wt % to less than 3.00 wt %, from at least 0.05 wt % to less than 2.00 wt %, from at least 0.05 wt % to less than 1.00 wt %, etc.) The remainder of the gas dehydration drying agent solution may be the solvent and optionally other additives used in gas dehydration drying agent solutions.

The pH buffering agent may be introduced to gas dehydration drying agent solution (e.g., to the solvent) as part of a buffer solution that includes another solvent that is separate from the solvent for the gas dehydration drying agent solution. The solvent for the buffer solution may include at least water. For example, the solvent for the pH buffering agent solution may include from 1 wt % to 100 wt % (e.g., 10 wt % to 100 wt %, 20 wt % to 100 wt %, 30 wt % to 100 wt %, 40 wt % to 100 wt %, 50 wt % to 100 wt %, 60 wt % to 100 wt %, 70 wt % to 100 wt %, 80 wt % to 100 wt %, 90 wt % to 100 wt %, 95 wt % to 100 wt %, etc.) of water. For example, the cyclohexylamino sulfonic salt may be introduced to the gas dehydration drying agent solution as a preformed buffer solution that includes from 1 wt % to 80 wt % (e.g., 1 wt % to 70 wt %, 1 wt % to 60 wt %, 1 wt % to 50 wt %, 5 wt % to 50 wt %, 5 wt % to 40 wt %, 10 wt % to 40 wt %, etc.) of the cyclohexylamino sulfonic salt based on a total weight of the preformed buffer solution. The remainder of the preformed buffer solution may be the solvent for the buffer solution and optionally other additives used in buffer solutions and/or gas dehydration drying agent solutions.

The solvent for gas dehydration drying agent solution includes at least one glycol. The pH buffering agent may be added directly to the solvent for the gas dehydration drying agent solution or may be added as the preformed buffer solution that includes the pH buffering agent and another solvent. By glycol it is meant a polyol with a nominal hydroxyl functionality of 2. The glycol has a number average molecular weight from 40 g/mol to 500 g/mol (e.g., 40 g/mol to 400 g/mol, 40 g/mol to 300 g/mol, 40 g/mol to 250 g/mol, 40 g/mol to 200 g/mol, etc.) The glycol may be derived from ethylene oxide and/or propylene oxide. Exemplary glycols include pentaethylene glycol, tetraethylene glycol, triethylene glycol, diethylene glycol, ethylene glycol, pentapropylene glycol, tetrapropylene glycol, tripropylene glycol, dipropylene glycol, and propylene glycol. Another exemplary glycol is poly glycols, such as those sold under the tradename Carbowax™ available from The Dow Chemical Company. The solvent may further include at least one polyol having a nominal hydroxyl functionality of 3 to 8. The polyol may have a number average molecular weight from 40 g/mol to 1500 g/mol (e.g., 40 g/mol to 1000 g/mol, 40 g/mol to 500 g/mol, 40 g/mol to 250 g/mol, 40 g/mol to 200 g/mol, 50 g/mol to 100 g/mol, etc.) Exemplary polyols include glycerol, ethoxylated glycerols, sorbitol, and ethoxylated sorbitols.

The solvent may include from 1 wt % to 100 wt % (e.g., 5 wt % to 100 wt %, 5 wt % to 99 wt %, 5 wt % to 95 wt %, 10 wt % to 100 wt %, 20 wt % to 99 wt %, 30 wt % to 99 wt %, 40 wt % to 99 wt %, 50 wt % to 99 wt %, 50 wt % to 95 wt %, 60 wt % to 95 wt %, 60 wt % to 90 wt %, 65 wt % to 85 wt %, 70 wt % to 80 wt %, etc.) of the at least one glycol, based on a total weight of the solvent (exclusive of any solvent that may be added with the pH buffering agent). The remainder of the solvent may be at least one polyol having a nominal hydroxyl functionality of 3 to 8, based on a total weight of the solvent. For example, the at least one polyol having a nominal hydroxyl functionality of 3 to 8 may be present in an amount from 1 wt % to 99 wt % (e.g., 1 wt % to 95 wt %, 5 wt % to 95 wt %, 5 wt % to 80 wt %, 5 wt % to 70 wt %, 10 wt % to 70 wt %, 5 wt % to 50 wt %, 5 wt % to 40 wt %, 10 wt % to 40 wt %, 15 wt % to 35 wt %, 20 wt % to 30 wt %, etc.)

The gas dehydration composition may further include other additives (e.g., additives known in the art). Exemplary additives include a corrosion inhibitor, an antifoaming agent, and mixtures thereof.

Gas Dehydration Applications

Gas dehydration composition may be used to remove water (e.g., water vapor) from gas (e.g., a stream of raw and/or treated natural gas). The gas dehydration composition may be suited for use in a gas that includes salts. Raw natural gas that may be treated with the gas dehydration composition may come from oil wells, gas wells, and/or condensate wells. Natural gas from oil wells may be termed "associated gas" and this gas may exist separate from oil in the formation (free gas) or dissolved in the crude oil (dissolved gas). Natural gas from gas and condensate wells, in which there is little or no crude oil, may be termed "non-associated gas". Gas wells may produce raw natural gas by itself, while condensate wells may produce free natural gas along with a semi-liquid hydrocarbon condensate. Whatever the source, once separated from crude oil (if present), the natural gas may exist as a mixture of methane and other hydrocarbons, water, salts, and other impurities, such as acid gases. The term "natural gas" as used herein below includes any natural gas source comprising water and salts including raw or treated natural gas. Treated natural gas is raw natural gas that has been treated one or more times to remove one or more impurities.

An exemplary gas dehydration process for removal of water and/or water and salts includes an absorber equipped with baffles, trays, random packing, structured packing, or combination thereof. An arriving gas stream may be admitted into the bottom of the absorber and flow up toward the top. Further, the lean gas dehydration composition may be admitted continuously into the top of the absorber and trickle downwardly in the absorber (e.g., over the baffles) in countercurrent exchange with the up flowing gas stream. The result may be that the water and/or salts in the gas are exposed to and preferentially partition into the more polar gas dehydration composition such that the gas exiting at the top of the absorber may have reduced and/or be substantially free of water and/or salts and the gas dehydration composition exiting the bottom of the absorber may be rich with these contaminants.

Water and/or salt-laden rich polyhydric alcohol solution of the present invention is pumped through a closed-loop (of which the absorber is part) including various filters, strippers, heat exchangers, etc., and a reboiler wherein the polyhydric alcohol solution of the present invention is conventionally heated and maintained at a temperature of from about 250° F. to about 400° F. such that the water is driven off. The resulting lean regenerated polyhydric alcohol solution of the present invention may then be returned through the remaining portion of the loop back to the absorber, again to flow in countercurrent exchange with natural gas comprising water and/or salts.

EXAMPLES

Approximate properties, characters, parameters, etc., are provided below with respect to the illustrative working examples, comparative examples, and the information used in the reported results for the working and comparative examples.

The materials used are the following:

| | |
|---|---|
| CAPS | A solid of greater than 99 wt % of 3-(Cyclohexylamino)-1-propanesulfonic acid (available from Sigma-Aldrich ®). |
| CHES | A solid of greater than 99.0 wt % of 2-(Cyclohexylamino)ethanesulfonic acid (available from Sigma-Aldrich ®). |
| Polyol Mixture | A mixture that includes 75 wt % of triethylene glycol and 25 wt % of glycerol. |
| HEPES | A solution greater than 99.5 wt % of 4-(2-Hydroxyethyl)piperazine-1-ethanesulfonic acid in water (available from Sigma-Aldrich ®). |
| NaOH Solution | A solution that includes 50 wt % of NaOH in water. |
| PTTS | A solution of potassium tetraborate tetrahydrate diluted in 45 wt % of water. |

Buffer solutions are prepared by mixing each of acids CHES, CAPS, and with a molar equivalent of NaOH and water to make the buffer salts CHESNa, CAPSNa, and HEPESNa, respectfully. In particular, the acid in the amount shown in Table 1 is suspended in water and the NaOH Solution. The resultant suspension is stirred for approximately 20 minutes to allow for the solids to sufficiently dissolve in the water. The corresponding in weight percentages are provided in Table 1, below.

TABLE 1

|  | Buffer Solution 1 | Buffer Solution 2 | Buffer Solution A |
|---|---|---|---|
| CHES (grams) | 2.07 | — | — |
| CAPS (grams) | — | 2.21 | — |
| HEPES (grams) | — | — | 2.38 |
| Water (grams) | 8.93 | 7.95 | 7.72 |
| NaOH Solution (grams) | 0.82 | 0.83 | 0.81 |
| Total Weight (grams) | 10.83 | 10.99 | 10.90 |
| Buffer Salt Concentration in the Buffer Solution (wt %) | 19.0 | 19.9 | 21.6 |

Referring to Table 1, the resultant Buffer Solution 1 is a solution of 19.0 wt % of CHESNa buffer salt in water, the resultant Buffer Solution 2 is a solution of 19.9 wt % of CAPSNa buffer salt in water, and the resultant Buffer Solution A is a solution of 21.6 wt % of HEPESNa buffer salt in water.

The buffer solutions from Table 1 can be mixed with the Polyol Mixture to form the gas dehydration solutions of Working Examples 1 and 2 and Comparative Example A, each having a buffer salt concentration of 0.9 wt % in the gas dehydration solution. In particular, an aliquot of the buffer solution from above is diluted in the Polyol Mixture to prepare the examples. The concentration of the buffer salt in Table 2 is calculated by multiplying the buffer solution concentration in the Polyol Mixture from Table 2 by the buffer salt concentration in the buffer solution from Table 1. For example, for Working Example 1 the concentration is calculated as follows: 4.7×0.19=0.9%.

TABLE 2

|  | Working Example 1 | Working Example 2 | Comparative Example A |
|---|---|---|---|
| Buffer Solution 1 (grams) | 1.08 | — | — |
| Buffer Solution 2 (grams) | — | 1.11 | — |
| Buffer Solution A (grams) | — | — | 1.08 |
| Polyol Mixture (grams) | 21.85 | 24.24 | 25.00 |
| Total Weight (grams) | 22.93 | 25.36 | 26.08 |
| Buffer Solution Concentration in the Polyol Mixture (wt %) | 4.7 | 4.4 | 4.1 |
| Buffer Salt Concentration in the Polyol Mixture (wt %) | 0.9 | 0.9 | 0.9 |

A Comparative Example B is prepared as the Polymer Mixture alone, without any buffer solution added.

Alkalinity tests are performed on Working Examples 1 and 2 and Comparative Examples A and B based on a modified version of test method ASTM 1121. The modification to ASTM 1121 is as follows: (i) 0.5 N HCl is used in place of 0.1 N HCl, and (ii) a dilution factor of 6 is used in place of 10 to dilute glycol in water. The results of the alkalinity tests over a volume of 0 to 0.8 mL are shown in FIG. 1.

Referring to FIG. 1, it is seen that the pH curves for Comparative Examples A and B can drop quickly, approximately a pH value of at least 1.0, at a volume of HCl between 0 and 0.2 mL as determined using the modified ASTM 1121 discussed above. In contrast, Working Examples 1 and 2, show a significantly more gradual drop in pH value (less than a pH value of 1.0 and/or less than a pH value of 0.5) in the same volume range of 0 and 0.2 mL, suggesting that the buffer solutions can more effectively maintain pH values in a certain narrow range as acid is added. Further, Working Examples 1 and 2 show a significantly more gradual drop in pH overall between a volume range of 0 and 0.6 mL. Also, Working Examples 1 and 2 can provide buffering at higher pH values than Comparative Example A. In this regard, for buffering at a pH of 9, Comparative Example A could be ineffective. However, Working Examples 1 and 2 are able to provide buffering at a pH greater than 9.0 (e.g., at a pH of 10, at a pH of 11, etc.), such that the buffer solutions are active over a broader range of pH values. Accordingly, the alkalinity tests suggest the buffer solutions according to embodiments disclosed herein in Working Examples 1 and 2 provide improved buffering, both with respect to maintaining pH values within a certain narrow range and providing effectiveness as a pH buffer over a broader range of pH values.

Referring to Table 3, below, following a similar procedure as discussed above, Buffer Solution 3 for Working Examples 3 and 4 is prepared by mixing 1.13 grams of CHES with 17.07 grams of water and 2.01 grams of the NaOH Solution to make the buffer solution having a CHESNa buffer salt concentration in water of 5.5 wt %. Similarly, Buffer Solution 4 for Working Example 5 is prepared by mixing 2.70 grams of CHES with 2.35 grams of water and 0.81 grams of the NaOH Solution to make the buffer solution having a CHESNa concentration of 45.7 wt %. Then, the buffer solution is mixed with the Polyol Mixture to form the gas dehydration solutions of Working Examples 3, 4, and 5 having varying buffering salt concentrations. In particular, an aliquot of the buffering agent solution is diluted in the Polyol Mixture to prepare the examples.

TABLE 3

|  | Working Example 3 | Working Example 4 | Working Example 5 |
|---|---|---|---|
| Buffer Solution 3 (grams) | 0.13 | 0.52 | — |
| Buffer Solution 4 (grams) | — | — | 5.86 |
| Polyol Mixture (grams) | 50.0 | 19.5 | 29.8 |
| Buffer Solution Concentration in the Polyol Mixture (wt %) | 5.5 | 5.5 | 45.7 |
| Buffer Salt Concentration in the Polyol Mixture (wt %) | 0.01 (140 ppm) | 0.1 (1400 ppm) | 7.5 |

Alkalinity tests are performed on Working Examples 3, 4, and 5 based on the modified version of test method ASTM 1121, discussed above. The results of the alkalinity tests are shown in FIG. 2.

Figure 2:
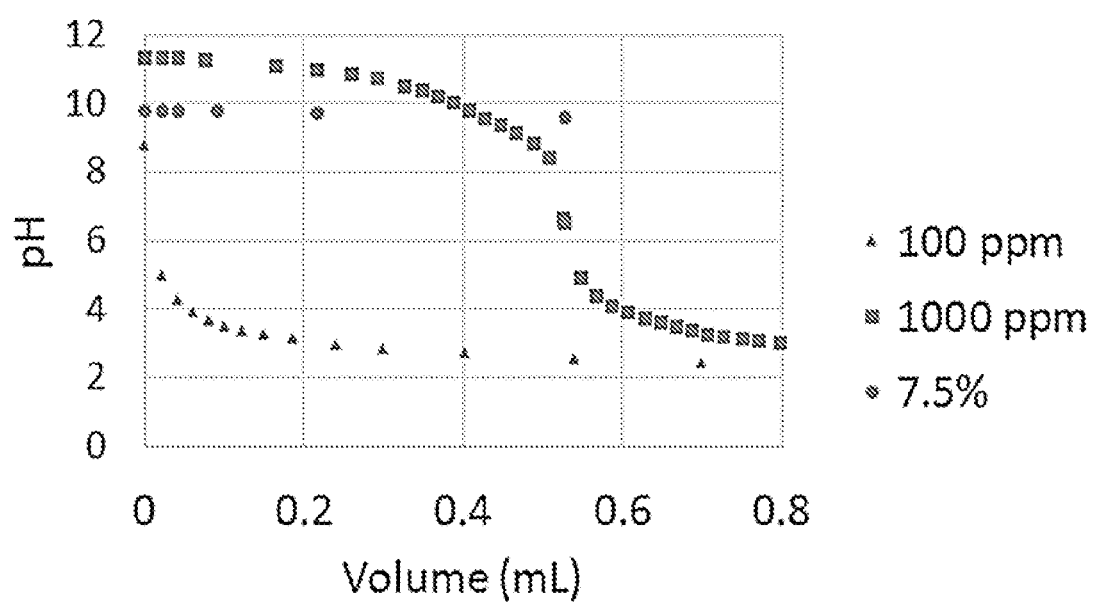
FIG. 2 illustrates alkalinity titration test data for Working Examples 3 to 5.

Referring to FIG. 2, it seen that at a buffer salt concentration in the Polyol Mixture of 0.01 wt % the buffer solution according to embodiments disclosed herein has some effectiveness for use as a pH buffer, as the initial pH is higher than what is realized by Comparative Example B (i.e., no buffer) shown in FIG. 1. Further, it is seen that at a buffer salt concentration in the Polyol Mixture of 0.1 wt %, the buffer solution according to embodiments disclosed herein is highly effective in both maintaining pH values within a certain narrow range (e.g., less than a pH value of 1.0 and/or less than a pH value of 0.5 between 0 and 0.2 mL) and providing effectiveness as a pH buffer over a broader range of pH values. Also, it is seen that buffer salt concentration in the Polyol Mixture of 7.5 wt %, the buffer solution according to embodiments disclosed herein is still effective in both maintaining pH values within a certain narrow range (e.g., less than a pH value of 1.0 and/or less than a pH value of 0.5 between 0 and 0.2 mL) and providing effectiveness as a pH buffer over a broader range of pH values. However, at 7.5 wt % the Polyol Mixture may be close to a solubility limit for the buffer solution. It is believed, after the solubility limit is reached, higher concentration of the buffer salt in the system may create undesired fouling issues as the salt may precipitate out of the solution, such as in a polyol mixture where the concentration of water is very low.

Referring to Table 4, thermal stability testing is performed using the Polyol Mixture. In particular, Working Example 6 includes 2 wt % of the Buffer Solution 1 and 98 wt % of the Polyol Mixture. Further, Comparative Example C includes 2 wt % of PTTS (a buffer acid solution know in the art) and 98 wt % of the Polyol Mixture. The Control example is the Polyol Mixture without any buffer solution added.

TABLE 4

|  | Control Example | Working Example 6 | Comparative Example C |
|---|---|---|---|
| Total Carboxylate Anion Concentration (ppm) | | | |
| After 14 Days | 0 | 101 | 884 |
| After 28 Days | 0 | 280 | 1336 |
| pH (50 wt % of the example in 50 wt % water) | | | |
| Initial | 3.84 | 9.58 | 7.20 |
| After 28 Days | 5.23 | 7.27 | 7.27 |

For the thermal stability testing, inside of a nitrogen glove bag, the examples (16 mL of each) to be tested are placed in a 20 mL stainless steel sample bomb and sealed. The sample bombs are placed into an oven at 220° C. for a total period of 28 days to mimic the condition of a gas dehydration reboiler. After that the fluid is cooled the pH of the solutions with 50/50 water dilution are measured using a pH meter. The total carboxylate anion of the fluid is measured by ion chromatography, both at 14 days and 28 days.

The stability testing demonstrates that Working Example 6, while comparable to the buffer solution known in the art (i.e., Comparative Example C) for maintaining pH, the buffer solution according to embodiments disclosed herein shows significantly improved performance with respect to the undesired build up carboxylate anions. Accordingly, Working Example 6 demonstrates both a slower build of anions as compared to Comparative Example C and maintenance of a desired near neutral pH as compared to the Control Example.

The invention claimed is:

1. A gas dehydration drying agent solution composition, the composition comprising:
    a solvent that includes at least one glycol having a number average molecular weight from 40 g/mol to 500 g/mol; and
    from 0.01 wt % to 8.00 wt % of a cyclohexylamino sulfonic salt in a buffer solution having the following structure:

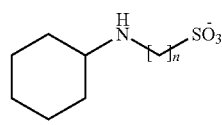

wherein n is from 1 to 6; wherein the buffer solution further includes at least one selected from the group of an alkali metal cation and an alkali-earth metal cation; wherein the solvent includes from 5 wt % to 95 wt % of the at least one glycol.

2. The composition as claimed in claim 1, wherein n is from 2 to 4.

3. The composition as claimed in claim 1, wherein the buffer solution is a preformed buffer solution that includes from 1 wt % to 80 wt % of the cyclohexylamino sulfonic salt based on a total weight of the preformed buffer solution.

4. The composition as claimed in claim 3, wherein the preformed buffer solution includes from 5 wt % to 50 wt % of the cyclohexylamino sulfonic salt based on the total weight of the preformed buffer solution.

5. The composition as claimed in claim 1, wherein the solvent further includes from 5 wt % to 50 wt % of at least one polyol having a nominal hydroxyl functionality of 3 to 8 and a number average molecular weight from 40 g/mol to 1500 g/mol.

6. A process for dehydrating gas, the process comprising:
    introducing to an absorber a gas stream and a gas dehydration drying agent solution composition, the composition comprising:
    a solvent that includes at least one glycol having a number average molecular weight from 40 g/mol to 500 g/mol; and
    from 0.01 wt % to 8.00 wt % of a cyclohexylamino sulfonic salt in a buffer solution having the following structure:

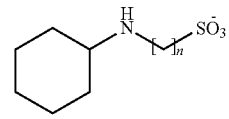

wherein n is from 1 to 6; wherein the buffer solution further includes at least one selected from the group of an alkali metal cation and an alkali-earth metal cation.

7. A process for manufacturing a gas dehydration drying agent solution composition, the composition comprising:
    a solvent that includes at least one glycol having a number average molecular weight from 40 g/mol to 500 g/mol; and
    from 0.01 wt % to 8.00 wt % of a cyclohexylamino sulfonic salt in a buffer solution having the following structure:

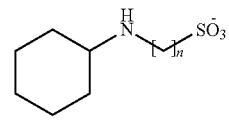

wherein n is from 1 to 6; wherein the buffer solution further includes at least one selected from the group of an alkali metal cation and an alkali-earth metal cation; and wherein the solvent includes from 5 wt % to 95 wt % of the at least one glycol;
the process including providing a buffer solution that includes the cyclohexylamino sulfonic salt and mixing the buffer solution with the solvent.

* * * * *